United States Patent [19]

Hartmann et al.

[11] 4,207,201

[45] Jun. 10, 1980

[54] PROCESS FOR THE MANUFACTURE OF AN AQUEOUS IRON (III)-CHLORIDE-SULFATE SOLUTION

[75] Inventors: Achim Hartmann, Pulheim; Achim Kulling; Dieter Schinkitz, both of Leverkusen; Edgar Klein, Odenthal-Osenau, all of Fed. Rep. of Germany

[73] Assignee: Kronos Titan GmbH, Leverkusen, Fed. Rep. of Germany

[21] Appl. No.: 884,424

[22] Filed: Mar. 8, 1978

[30] Foreign Application Priority Data

Mar. 11, 1977 [DE] Fed. Rep. of Germany ....... 2710969

[51] Int. Cl.² .................... C01G 49/10; C01G 49/14; C01B 17/45; C02B 1/36
[52] U.S. Cl. .................................. 252/191; 210/62; 252/178; 422/19; 423/147; 423/467
[58] Field of Search ................. 252/191, 175, 178; 423/138, 147, 467, 468; 422/19; 210/62

[56] References Cited

U.S. PATENT DOCUMENTS

| 2,047,571 | 7/1936 | Eberstadt | 423/467 |
| 2,137,361 | 11/1938 | Slaglo | 423/467 |

FOREIGN PATENT DOCUMENTS

| 146214 | 4/1921 | United Kingdom | 423/467 |
| 146218 | 4/1921 | United Kingdom | 423/467 |
| 444721 | 5/1934 | United Kingdom | 423/467 |

Primary Examiner—Benjamin R. Padgett
Assistant Examiner—Irwin Gluck
Attorney, Agent, or Firm—Gary M. Nath

[57] ABSTRACT

The application is concerned with a process for the manufacture of an aqueous iron (III)-chloride-sulfate solution by the oxidation of iron (II) sulfate with chlorine in aqueous solution.

7 Claims, 1 Drawing Figure

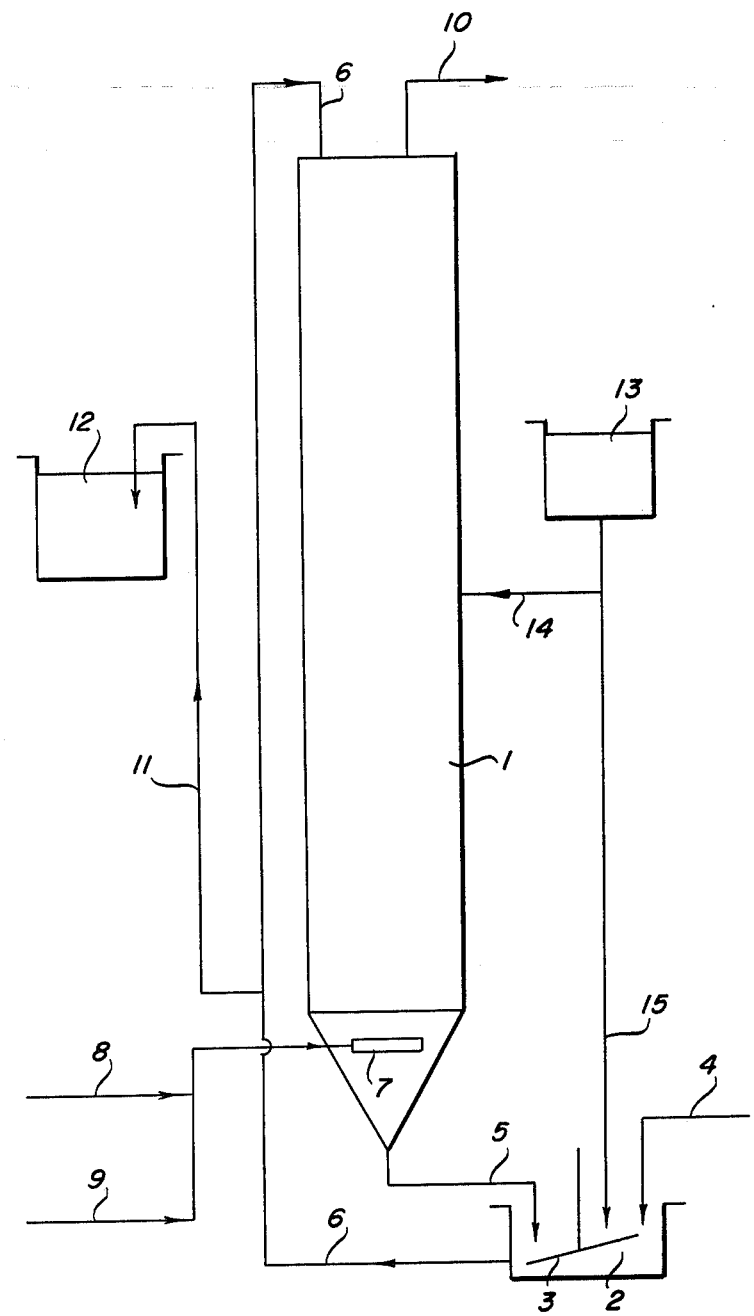

PROCESS FOR THE MANUFACTURE OF AN AQUEOUS IRON (III)-CHLORIDE-SULFATE SOLUTION

In the manufacture of titanium dioxide from ilmenite according to the so-called "sulfate process" iron (II) sulfate heptahydrate is obtained in large amounts. For reasons of economy and in order to reduce the harmful effect on the environment, it is desirable that this iron (II) sulfate heptahydrate be used in a profitable way.

The use of iron salts for the treatment of impure water and sewage is known.

It has been suggested that iron (III) chloride-sulfate solutions (German DT-OS No. 21 47 999) be used for this purpose. These solutions are manufactured by the oxidation of iron (II) sulfate solutions with chlorine.

The corresponding employment of iron (II) sulfate heptahydrate from the titanium dioxide manufacture encounters difficulties which are caused by the fact that this iron (II) sulfate heptahydrate contains small amounts of titanyl sulfate which tends to hydrolyze. The precipitating titanium dioxide hydrate renders the product unusable. The removal of the fine particle size hydrate from the finished solution is difficult since it hardly settles and clogs the filter. To surmount these difficulties new process steps which required special expensive devices were necessary up to now.

It is therefore essential to direct the oxidation with chlorine in such a way that the hydrolysis of the titanyl sulfate does not occur. It has now been found that this can be achieved by the selection of suitable temperatures and staying or residence times as well as by the control of the dissolving process of the iron (II) sulfate heptahydrate.

The hydrolysis of the titanyl sulfate is a time reaction of which the velocity increases strongly at elevated temperature. Accordingly, an upper temperature limit must be considered above which the hydrolyzing begins spontaneously and takes place quickly. The temperature must be the higher, the shorter the time that it affects the reaction partner. In practice, temperature and duration must be related to each other in a suitable manner. Particularly critical is the type of introduction of the iron (II) sulfate heptahydrate into the reaction system because in this the nuclei formation reactions for the hydrolysis of the titanium dioxide hydrate are started. It is suitable not to dissolve the main part of the iron (II) sulfate heptahydrate in the water prior to the start of the oxidation, but to add it gradually during the oxidation to the partly oxidized solution.

In order to carry out the oxidation in the shortest time possible, the application of high pressure is an effective means. An additional mode of action consists in giving the chlorine a long passage through the liquid. Both can be achieved especially by carrying out the oxidation in a tower.

The invention is concerned with a process for the manufacture of an aqueous iron (III)-chlorine-sulfate solution by the oxidation of iron (II) sulfate in aqueous solution with chlorine. It is characterized in that:

a. the oxidation is carried out in a reactor into which the chlorine is introduced at an over-pressure of at least 1 bar, preferably 1 to 4 bar over the normal or atmospheric pressure, into an iron (III) chloride-sulfate-containing solution of iron (II) sulfate which contains at least 1 percent by weight of bivalent iron, b. this content of bivalent iron is maintained in such a way that the reaction solution is continuously recycled by pumping it over a dissolving vat into which solid iron (II) sulfate heptahydrate is added in dosed quantities in, c. by suitably dosed addition of the iron (II) sulfate heptahydrate the oxidation temperature is kept in the range from about 40° to 70° C., i.e., so that the heat of solution used up in the dissolving of the iron (II) sulfate heptahydrate and the heat of reaction produced during the oxidation about compensate each other, and d. the maximum duration of the reaction solution in the reactor should not exceed about 4 hours.

In general, the oxidation is carried out in a tower filled with the reaction solution, in which tower a device is arranged at the bottom for the introduction of chlorine. Following a preferred form of the process according to the invention, the over-pressure in the chlorine introduction is produced by the weight of the liquid column above the chlorine line.

It is, however, not absolutely necessary that the entire amount of over-pressure be produced by the liquid column. Another suitable way of carrying out the invention is characterized in that the over-pressure is produced in the chlorine supply line by the liquid column in this chlorine supply line as well as by the fact that an over-pressure is arranged above the liquid column in the gas space.

By introducing the chlorine under an over-pressure the reaction which under normal pressure in the stated temperature range occurs too slowly is suitably accelerated. When repumping the reaction solution in a cycle it arrives from the reactor first into the dissolving vat. In this iron (II) sulfate heptahydrate is dissolved. In this reaction heat is consumed so that the solution cools off. This cooled solution enriched with bivalent iron is passed into the reactor. Heat is liberated again in the reactor by the oxidation of the bivalent iron by the introduced chlorine so that the solution becomes warm in the reactor. By controlling the pumping rate and the chlorine introduction care is taken that the heat of solution of the iron (II)-sulfate heptahydrate and the heat of reaction originated in the oxidation compensate each other to some extent so that the oxidation temperature is maintained in the range from 40° to 70° C. In this control, at the same time, heat losses which occur in the repumping of the solutions in the pipes are taken into consideration. An overheating of the reaction solution in the reactor can thereby safely be avoided and the oxidation can be controlled with certainty. At the same time the dissolving of the iron (II)-sulfate heptahydrate is arranged to take place at such low temperatures that there is no danger of an hydrolysis of the titanyl sulfate present. It is not necessary during the operation to introduce heat from the outside for the solution of the iron (II)-sulfate heptahydrate. In this respect the process is a great energy saver.

It is possible to obtain high iron (III) concentrations in the iron (III) chloride sulfate solution even if the iron (II) sulfate in the solution flowing into the reactor is slight.

Prior to the oxidation a certain content of bivalent iron must be contained in the solution. If the iron (II) content of the solution is too low, then the chlorine intake is disturbed. The minimum content should, therefore, be at about 1% by weight of bivalent iron. Towards the upper limit the iron (II) content is limited by the solubility of iron (II) sulfate under the prevailing conditions.

Normally it is desired to obtain a certain iron concentration in the finished iron (III)-chloride-sulfate solution. This will ordinarily amount to between 10 and 13% by weight iron. Lower concentrations are generally unfavorable owing to the large volumes of liquid carried along and higher concentrations tend to cause recrystallization of the salt.

By the fact that the duration of the reaction solution in the reactor (residence time) does not exceed about 4 hours, care is taken that a hydrolysis of the titanyl sulfate which could occur at longer remaining time at lower temperatures is also safely avoided. If the temperature of the reactor is above 60° C., then the staying period of the reaction solution in the reactor should not exceed about 3 hours.

The process may be carried out discontinuously or continuously.

If the process is carried out discontinuously then a particular development of the invention is seen in that at the start of a charge, prior to the conveying of chlorine, a definite amount of water is added to the cycle, an amount sufficient to provide an aqueous solution containing at least about 1 percent by weight bivalent iron and effective for dissolving the desired amount of iron (II) sulfate heptahydrate and carrying out the reaction, and that near the end of the charge the iron (II) sulfate heptahydrate addition is stopped, whereupon the residual bivalent iron is oxidized in the reactor and finally the iron (III)-chloride-sulfate solution obtained is removed from the reactor.

At the start of a charge a certain amount of iron (III)-chloride-sulfate solution, originating from the preceding charge, may be in the dissolving vat.

As the case may be, additional water may be added after the start of the charge and/or after the end of the reaction in order to correct the iron content of the iron (III)-chloride-sulfate solution.

If the process is carried out continuously, then the process is suitably carried out in such a way that water is added continuously to the cycle to maintain a pumpable solution and dissolve the iron (II) sulfate heptahydrate and that a part of the stream of the solution, of which the iron content amounts to about 80% of trivalent iron, is drawn off continuously and that this partial stream is oxidized to finality in a second attached reactor.

The water addition may be carried out at various locations, for example, into the reactor and/or the dissolving vat.

The chlorine employed may be liquid or gaseous. It may be used in pure form or in mixture with other gases, e.g., carbonic acid, nitrogen or air, as obtained as by-product of other processes. The introduction of the chlorine into the reaction liquid is carried out, in general, by means of a distributor, e.g., a frit or introduction nozzles.

The solution containing the bivalent iron may be introduced into the reactor at various locations. It is often advantageous to introduce this solution into the upper part of the reactor. It is, furthermore, possible to introduce it from above into the gas space above the liquid column, that is, as the case may be, under pressure, and to spray it at the same time, or to introduce it by means of an injector which effects a local turbulence of the gas for intensively mixing the introduced liquid in the form of fine droplets with the gas, such as a water jet injector pump. In this way the non-reacted chlorine residues from the gas space are washed out above the level of the liquid so that the waste gases are largely freed of chlorine.

The iron (III)-chloride-sulfate solution obtained is free of titanium dioxide hydrate. Coarse residues that originate from the iron (II) sulfate heptahydrate are easily removed in a settling step. The solution is then without further trouble storable and saleable.

FIG. 1 illustrates schematically a device which was employed in carrying out the invention.

For better understanding valves and pumps are not drawn in.

The reactor 1 was a cylindrical, closed steel tower rubber-coated inside with a conical bottom. It had an inside diameter of 0.8 m and a height of 8.2 m. In the conical part of the bottom was a frit with a diameter of 0.35 m. The frit and the conical reactor wall formed a ring slot through which the liquid is passed. At the entrance of line 6 which is a return line for introducing reaction solution enriched with iron (II) sulfate into the reactor 1 was a nozzle 6' for spraying the liquid. The dissolving vat 2 had an inside diameter of 0.8 m and a height of 0.9 m and was fitted with a propeller stirring device 3 and a level control (not shown). The water container 13 had a capacity of 4 m$^3$.

The storage container 12 for iron (III)-chloride-sulfate solution was made of steel and was rubber-coated inside.

First, 1.43 m$^3$ water were heated in the water container 13 to 70° C. by means of steam and then emptied into the reactor 1 while the frit 7 had already been charged with air through line 9. Subsequently the water was transferred into the dissolving vat 2 in which there was 0.1 m$^3$ iron (III)-chloride-sulfate solution with a content of 12% by weight iron and the liquid kept circulating between dissolving vat 2 and reactor 1 by means of the circulating pump (not shown) while, simultaneously, iron (II) sulfate heptahydrate, amounting to 2 t/h, was fed to the dissolving vat through feed line 4. After 7 minutes the temperature in the circulating liquid was lowered to 50° C. and its iron (II) content consisted of 28 gpl iron. The air addition through the line 9 and frit 7 was now stopped and chlorine amounting to 50 m$^3$/h (volume of the gas in the normal state) was introduced through line 8. The temperature remained constant in the range of from 50° to 55° C. The pressure at the height of the frit 7 amounted to 1.2 to 1.5 bar above normal pressure. After a run of 2 hours the addition of iron (II) sulfate heptahydrate was stopped so that a total of 4 tons had been dissolved. The solution still present was pumped from the dissolving vat into the reactor 1 and the chlorine introduction was continued for an additional hour. Toward the end of the reaction the chlorine addition was steadily reduced, depending on the iron (II) sulfate content of the solution and the pressure in the gas space of the reactor.

The liquid volume in the reactor increased from initially 1.43 m$^3$ to 4 m$^3$ so that in the end a liquid column of 8 m high stood in the reactor (density of the liquid 1.5 g/cm$^3$). By the increase of the volume of the liquid the air originally present in the reactor 1 was to the largest part pushed out through the waste gas pipe 10 via a hydraulic closure. The finished solution had a total iron content of 180 gpl; of this only 1 gpl was present in the bivalent form. The solution was transferred into container 12. It was clear.

Changes concerning the procedure and the device shown are possible. For example, from the water container 13 a conduit 15 can reach directly into the dissolving vat 2. The exit pipe 11 may come directly from the reactor 1; it may, for example, be arranged in the shape of an overflow through which, after reaching a certain height of the liquid level in the reactor 1, iron (III)-chloride-sulfate solution is continuously drawn off. The return pipe 6 may empty at other places into the reactor 1. In the procedure just described the iron (II) sulfate heptahydrate is dissolved in an open dissolving vat 2. This vat may also be closed.

The iron (III)-chloride-sulfate solution prepared according to the invention may be employed for the purification of water and sewage, for sludge conditioning, the working up of cooling water of power stations and other purposes for which the use of iron (III)-chloride-sulfate or other water-soluble iron (III) salts is known.

It is claimed:

1. Process for the manufacture of an aqueous iron (III)-chloride-sulfate solution by the oxidation of iron (II) sulfate with chlorine in aqueous solution in a reactor comprising introducing chlorine into the reactor at an excess pressure of at least 1 bar, said reactor containing an iron (III)-chloride-sulfate solution of iron (II) sulfate which contains at least about 1% by weight bivalent iron, and said chlorine being introduced into said solution, maintaining this content of bivalent iron by passing the reaction solution continuously through the reactor and a dissolving vessel and adding solid iron (II) sulfate heptahydrate in the dissolving vessel, maintaining the oxidation temperature in the range of from about 40° to 70° C. by the suitably dosed addition of an effective amount of iron (II) sulfate heptahydrate to maintain the temperature in the range of from 40° to 70° C. by compensation between the heat of solution used up in the dissolving of the iron (II) sulfate heptahydrate and the heat of reaction produced in the oxidation; the maximum residence time of the reaction solution in the reactor being less than 4 hours.

2. Process according to claim 1, characterized in that the excess pressure in the chlorine introduction is created by the weight of the liquid column above the point of chlorine introduction.

3. Process according to claim 1, characterized in that the excess pressure in the chlorine introduction line is produced both by the weight of the liquid column above the chlorine intake and by maintaining an excess pressure over the liquid column in the reactor.

4. Process according to claim 1, characterized in that the residence time of the reaction solution in the reactor at temperatures above 60° C. does not exceed 3 hours.

5. Process according to claim 1, characterized in that the process is carried out discontinuously and further including adding water to the reactor prior to the introduction of chlorine to dissolve iron (II) sulfate heptahydrate the addition of the iron (II) sulfate heptahydrate being stopped towards the end of the process so that the residual bivalent iron present in the iron (III)-chloride-sulfate solution in the reactor is oxidized, and finally removing the iron (III)-chloride-sulfate solution from the reactor.

6. Process according to claim 1, characterized in that the process is carried out continuously by and further including adding water continuously into the reaction solution and continuously removing a part of the reacting solution from the reactor, the iron content of which removed part consists of about 80% of trivalent iron and finally oxidizing this removed part in a second reactor.

7. Process according to claim 1, characterized in that the excess chlorine pressure is 1 to 4 bar.

* * * * *